United States Patent [19]

Smart

[11] Patent Number: 4,992,103
[45] Date of Patent: Feb. 12, 1991

[54] CEMENTITIOUS COMPOSITIONS

[75] Inventor: Roderick M. Smart, Birmingham, United Kingdom

[73] Assignee: Fosroc International Limited, Birmingham, England

[21] Appl. No.: 423,632

[22] Filed: Oct. 18, 1989

Related U.S. Application Data

[63] Continuation of Ser. No. 178,158, Apr. 6, 1988, abandoned.

[30] Foreign Application Priority Data

Apr. 8, 1987 [GB] United Kingdom ............ 878429

[51] Int. Cl.$^5$ .............................................. C04B 7/32
[52] U.S. Cl. ..................................... 106/695; 106/692
[58] Field of Search ....................... 106/104, 692, 695

[56] References Cited

U.S. PATENT DOCUMENTS

| | | | |
|---|---|---|---|
| 3,922,172 | 11/1975 | Crinkelmeyer et al. | 106/104 |
| 4,030,939 | 6/1977 | Mallow | 106/74 |
| 4,357,166 | 11/1982 | Babcock | 106/89 |
| 4,357,167 | 11/1982 | Kellet et al. | 106/97 |
| 4,436,645 | 3/1984 | Ceaser | 252/179 |
| 4,798,628 | 1/1989 | Mills et al. | 106/104 |

FOREIGN PATENT DOCUMENTS 61-86454  5/1986  Japan ................................ 106/104

Primary Examiner—William R. Dixon, Jr.
Assistant Examiner—Alan Wright
Attorney, Agent, or Firm—Caesar, Rivise, Bernstein, Cohen & Pokotilow, Ltd.

[57] ABSTRACT

A dry composition comprising an aluminous cement and a calcium sulphate, and preferably an accelerator and a water soluble fluoride may be reacted with water in a wide range of proportions to form a rapid setting material which develops high compressive strength.

16 Claims, No Drawings

CEMENTITIOUS COMPOSITIONS

This application is a continuation of application Ser. No. 178,158, filed Apr. 6, 1988, now abandoned.

The invention relates to cementitious compositions, more particularly, cements which are aluminous, ie. comprise aluminates examples being $CaO.Al_2O_3$, $12CaO.7Al_2O_3$ and $4CaO.Al_2O_3.Fe_2O_3$. Such aluminates are typically present in high alumina cement (also called "Cement Fondue", "alumina cement" or "super alumina cement" which for convenience are collectively called herein "HAC"). HAC is any preformed cement which contains about 20 to about 70% by weight of alumina and has an alumina to calcium oxide ratio of between 0.3 and 2:1. One such HAC is the LAFARGE FONDU cement described in British Patent No. 1506417. This contains not less than 32% by weight of alumina and has an alumina:calcium oxide ratio of between 0.85 and 1.3:1 and a typical analysis of such a cement is, by weight, 39.0% alumina, 38.5% calcium oxide, 16.5% iron oxide ($Fe_2O_3$) and 4.0% silica. Typically HAC's take a long time (3–6 hours) to reach initial and final set. They may be further delayed in hydraulic activity by controlling the composition on formation, eg. by producing substantially monocalcium aluminate or a sulphoaluminous compound such as $3CaO.3Al_2O_3.CaSO_4$. Alternatively, retarders may be added. In such delayed compositions set may not occur for many days.

It is known to add fluorine as a mineraliser to ingredients used to make cements. The fluorine promotes the formation of fluorinated intermediate compounds which, in the kiln, are decomposed to form clinker minerals which are required to provide the final cement. GB patent No. A-1302725 teaches the use of fluoride to increase fluidity in a melt of $CaO$, $CaSO_4$ and $Al_2O_3$ and one inorganic fluoride to form a cement additive which will offset the shrinkage of an expansive cement on hydration. U.S. Pat. No. A-4452637 teaches an additive for expansive cement comprising a pulverised clinker including 5 to 30% of $CaF_2$. The lower limit is selected to avoid problems on hydration of the cement and the upper limit to control the conditions when the mixture is fired in a kiln. Chemical Abstracts CA: 98.108224F teaches the addition of $CaF_2$ to a mixture comprising aluminous cement, a hydraulic binder and gypsum and the formed mix was fired, moulded and hardened and found to have increased compressive strength at an early stage. European patent publication No. A-0181739 teaches that the use of a fluoride, eg $CaF_2$ enables a cement-forming mixture to be treated at lower burning temperatures and that the hydraulic reaction may be retarded. U.S. Pat. No. A-4115140 teaches that the use of silicic acid containing fluorine as an impurity to be mixed with sand and an expansive agent is beneficial in making cellular concrete. The sand/silicic acid and fluorine/water slurry remained pumpable, and the set products had reduced shrinkage. Chemical Abstracts CA:105:84228A teaches that the addition of a water soluble inorganic fluoride to an aluminous cement increases workability and high strength.

It is known to provide cementitious compositions comprising preformed HAC and an accelerator therefor together with a calcium sulphate so that ettringite will be formed.

The invention is based on the realisation that the addition of water soluble fluoride to a cementitious composition comprising aluminous cement, a calcium sulphate and an accelerator, will cause the composition to set rapidly and to develop high early strength even when that composition is mixed with water at a high water: solids weight ratio.

In one aspect therefore, the invention provides a dry aluminous cement composition for mixing with water to form a rapid setting composition, comprising a mixture of preformed aluminous cement, a calcium sulphate, an accelerator and a water soluble fluoride.

The calcium sulphate may be any such sulphate having a degree of water solubility. Preferably the calcium sulphate is gypsum or calcium sulphate hemihydrate or anhydrite. The content of the sulphate may be varied widely, for example, in a weight ratio of from about 3:7 to 4:1 high alumina cement: sulphate.

Examples of suitable water soluble fluorides include sodium fluorides and silicofluorides. Fluorides having a significant degree of water solubility are preferred. Specific fluorides are sodium fluoride, potassium fluoride and the like. The use of sodium fluoride is preferred because of its water solubility and reactivity. The content of the fluoride relative to the aluminous cement will depend on the particular fluoride (or fluorides) present and may be up to about 20% by weight in the case of sodium fluoride, and is preferably about 4 to about 10% by weight. Lower concentrations of fluoride are preferred because we have observed that above a concentration the beneficial effect tends to be reduced.

The accelerator acts as an accelerator and also as a nucleating agent to promote the formation of ettringite. Preferred nucleating agents include lithium salts, most preferably lithium hydroxide or lithium carbonate. The concentration of this agent may be from about 0.1 to about 1% by weight, relative to the aluminous cement. It should be appreciated however that this ingredient can be omitted.

Additives may be present, provided that they do not adversely affect the desired reaction. Examples include minor proportions of Ordinary Portland Cement, organic and inorganic retarders, lime surfactants, suspension agents, thickeners, colorants and the like.

In another aspect, the invention includes a method of making a rapid setting material which will develop early compressive strength, comprising mixing a composition as disclosed herein with water to form a slurry, and allowing that to set.

It is a particularly advantageous feature of the invention that the water : solids ratio may vary widely and the benefits of the invention will be obtained. Thus the ratio may vary from about 1 to about 4:1. The slurry may be formed by mixing water with the dry composition which preferably comprises the HAC, the sulphate, lithium derivative and fluoride. We have found however that the ingredients may be mixed with the water in any sequence, but for improved rate of set without adverse effect, the fluoride is best not used alone with the HAC. In one embodiment, there are two slurries and the aluminous cement and water make up one slurry and the calcium sulphate, the lithium accelerator and fluoride and water make up a second slurry and the slurries are mixed at a place of use.

When a composition of the invention sets, the solution has a pH of about 11.2 which is typical of ettringite, ie. a calcium trisulpho-aluminate having 32 molecules of water of crystallisation and of the formula $3CaO.Al_2O_3.3CaSO_4.32H_2O$. The composition will have a rapid rate of set and dependent on the nature and concentration of nucleating agent, will develop a required strength rapidly. Dependent on the use, this may range from about 1 to about 4N/mm² after 2 hours.

The dry aluminous cement composition may be used for a wide variety of industrial purposes. One specific area of use is in mining where the material may be used for stowing or partially filling cavities, other uses are for mass placement and as high yield grouts. In one particularly preferred aspect the invention provides a method of stowing or filling a cavity with a filling medium comprising mixing a dry cement composition as disclosed herein with water to form a slurry and supplying that to the cavity.

The invention is illustrated by the following examples in which parts are by weight. Example I shows that both a water soluble fluoride and a lithium salt are required for significant early set and high strength development; Example II shows that this effect is manifest even if the water : solids ratio is varied; Example III shows that gypsum can be used as the source of calcium sulphate; and Examples IV to VIII that different one shot compositions can be used. Example IX shows that the composition can include a minor proportion of an additive such as Ordinary Portland cement. The term initial set means the period until gelling took place when the water is trapped and no bleed occurs. The term final set means the period when the set material was sufficiently stiff for demoulding or deshuttering to be done. Compressive strengths were measured using a 200KN cube crusher.

EXAMPLE 1

Different compositions were made up as specified in the Table below, and the rate of set and strength development were noted. The results are also included in the Table.

TABLE

| | 1 | 2 | 3 | 4 |
|---|---|---|---|---|
| HAC | 100.0 | 100.0 | 100.0 | 100.0 |
| $CaSO_4.1/2H_2O$ | 100.0 | 100.0 | 100.0 | 100.0 |
| LiOH | — | 0.4 | — | 0.4 |
| NaF | — | — | 4.0 | 4.0 |
| water | 200.0 | 200.0 | 200.0 | 200.0 |
| initial set (mins) | 85 | 40 | 14 | 12 |
| final set (mins) | 180 | 50 | 25 | 24 |
| Compressive strength (N/mm²) | | | | |
| 2 hour | none | 0.93 | 1.81 | 4.3 |
| 24 hour | 0.5 | 1.94 | 2.32 | 6.41 |

These results show that only when both the fluoride and the lithium salt nucleating agent are present is there a rapid rate of set and strength development.

EXAMPLE II

Aqueous slurries were made up as follows:

| (a) | HAC | 100.0 |
|---|---|---|
| | water | 220.0 |
| (b) | $CaSO_4.1/2H_2O$ | 100.0 |
| | NaF | 4.0 |
| | LiOH | 0.4 |
| | water | 220.0 |

The two slurries were mixed together to form test cubes, and the following properties were noted:

| initial set (mins) | 20 |
|---|---|
| final set (mins) | 35 to 40 |

| Compressive strength (N/mm²) | |
|---|---|
| 2 hours | 0.68 |
| 24 hours | 2.45 |
| 7 days | 3.90 |
| 28 days | 3.95 |

These results show that even when used in water : solids ratio of 2.2:1 the desired rate of set and compressive strength are achieved.

EXAMPLE III

Aqueous slurries were made up as follows:

| (a) | HAC | 100.0 |
|---|---|---|
| | water | 200.0 |
| (b) | $CaSO_4.2H_2O$ | 100.0 |
| | NaF | 4.0 |
| | LiOH | 0.4 |
| | water | 200.0 |

The two slurries were mixed together to form test cubes, and the following properties were noted:

| initial set (mins) | about 90 |
|---|---|
| final set (mins) | about 140 |
| Compressive strength (N/mm²) | |
| 2 hours | 0.21 |
| 24 hours | 2.02 |
| 7 days | 2.71 |
| 28 days | 2.94 |

These results show that gypsum can be used as the source of calcium sulphate.

EXAMPLE IV

A composition was made up of

| HAC | 50.0 |
|---|---|
| $CaSO_4.1/2H_2O$ | 50.0 |
| NaF | 5.0 |
| LiOH | 0.2 | and mixed with water in different ratios of water:powder to form test cubes. The compressive strengths were measured at intervals, and the following results noted:

| W/P ratio: | 1.25 | 1.75 | 2.00 | 2.25 | 2.50 |
|---|---|---|---|---|---|
| age 2 hours | 3.74 | 2.61 | 2.14 | 1.74 | 1.23 |
| 24 hours | 5.98 | 5.43 | 4.70 | 2.89 | 2.71 |
| 7 days | 9.42 | 7.09 | 5.59 | 3.68 | 3.14 |
| 28 days | 9.73 | 7.64 | 6.68 | 3.98 | 3.52 |

(W/P is ratio of water:solids).

These results show that even using a single slurry, one can achieve the rapid set and strength development.

EXAMPLE V

A composition was made up of

| HAC | 100.0 |
|---|---|
| $CaSO_4.1/2H_2O$ | 100.0 |
| LiOH | 0.4 |
| $CaF_2$ | 10.0 |
| Water | 350.0 |

The water:powder ratio is 1.67:1. The composition was allowed to set to form test cubes and the compressive strength was measured. The following results were obtained:

| Initial set (mins) | 45 |
|---|---|
| Final set (mins) | 70 |
| Compressive strengths (N/mm$^2$) | |
| 2 hours | 0.96 |
| 24 hours | 2.39 |
| 7 days | 4.02 |
| 28 days | 4.84 |

EXAMPLE VI

A composition was made up of

| HAC | 100.0 |
|---|---|
| CaSO$_4$.1/2H$_2$O | 100.0 |
| LiOH | 0.4 |
| CaF$_2$ | 10.0 |
| Water | 600.0 |

The water:powder ratio is 1.85:1. The composition was allowed to set to form test cubes and the compressive strength was measured. The following results were obtained

| Initial set (mins) | 75 |
|---|---|
| Final set (mins) | 95 |
| Compressive strengths (N/mm$^2$) | |
| 2 hours | 0.63 |
| 24 hours | 2.04 |
| 7 days | 2.53 |
| 28 days | 3.61 |

EXAMPLE VII

A composition was made up of

| HAC | 100.0 |
|---|---|
| CaSO$_4$.2H$_2$O | 100.0 |
| LiOH | 0.4 |
| NaF | 5.0 |
| Water | 300.0 |

The water:powder ratio is about 1.42:1 and the calcium sulphate is gypsum. The composition was allowed to set to form test cubes and the compressive strength was measured. The following results were obtained:

| Initial set (mins) | 75 |
|---|---|
| Final set (mins) | 105 |
| Compressive strengths (N/mm$^2$) | |
| 2 hours | 0.34 |
| 4 hours | 1.01 |
| 24 hours | 2.34 |
| 7 days | 4.61 |

EXAMPLE VIII

A composition was made up of

| HAC | 100.0 |
|---|---|
| CaSO$_4$(natural anhydrite) | 100.0 |
| LiOH | 0.4 |
| NaF | 5.0 |
| Water | 350.0 |

The water:powder ratio is 1.67:1. The composition was allowed to set to form test cubes and the compressive strength was measured. The following results were obtained:

| Initial set (mins) | 70 |
|---|---|
| Final set (mins) | 95 |
| Compressive strengths (N/mm$^2$) | |
| 2 hours | 0.45 |
| 4 hours | 3.38 |
| 24 hours | 3.69 |
| 7 days | 4.38 |

EXAMPLE IX

A number of compositions were made up according to the Table below, and then tested for the initial set and compressive strengths.

TABLE

| HAC | 50 | 50 | 50 | 50 |
|---|---|---|---|---|
| CaSO$_4$.1/2 H$_2$O | 50 | 50 | 50 | 50 |
| NaF | 5 | 5 | 5 | 5 |
| LiOH | 0.2 | 0.2 | 0.2 | 0.2 |
| OPC | 0 | 2 | 4 | 8 |
| initial set (mins) | 10-15 | 5-10 | 5-10 | 5 |
| 2 hour strength | 2.67 | 3.00 | 2.75 | 2.34 |
| 24 hour strength | 3.58 | 4.41 | 4.02 | 3.85 |

The water:solids ratio was 1.75:1. These results show that when a minor proportion of OPC (Ordinary Portland Cement) is present, the rapid setting and development of early compressive strength is enhanced.

What is claimed:

1. A method of stowing or partially filling a cavity in a mine, the method comprising mixing with water a dry cementitious composition comprising an aluminous cement, a calcium sulphate, a water soluble fluoride, and an accelerator comprising a lithium salt, the calcium sulphate being present in a weight ratio of about 3:7 to 4:1 relative to the aluminous cement, the water soluble fluoride being present in a weight ratio of about 4 to about 10% by weight relative to the aluminous cement, the accelerator being present in a weight ratio of about 0.1 to about 1% relative to the aluminous cement, the dry cementitious composition being mixed with the water in a weight ratio of water : solids of about 1 to about 4:1 to form a slurry, supplying the slurry to the cavity and allowing the composition to set rapidly to form ettringite and develop early compressive strength.

2. A method according to claim 1, wherein the water soluble fluoride is sodium fluoride.

3. A method according to claim 1, wherein the calcium sulphate is gypsum or calcium sulphate hemihydrate or anhydrite.

4. A method according to claim 1, wherein the aluminous cement is high alumina cement or calcium monoaluminate or both.

5. A method of making a slurry of a rapid setting material which will develop early compressive strength, the method comprising mixing water and a dry cementitious composition comprising an aluminous cement and calcium sulphate, a water soluble fluoride and an accelerator comprising a lithium salt, the calcium sulphate being present in a weight ratio of about 3:7 to about 4:1 relative to the cement, the water soluble fluoride being present in a concentration of from about 4% to about 10% by weight relative to the aluminous cement, the accelerator being present in a weight ratio of about 0.1 to about 1% relative to the aluminous cement, whereby when the cementitious composition is mixed in a weight ratio of water : solids of about 1 to about 4:1, the composition sets and ettringite is formed and early compressive strength is developed.

6. A method according to claim 5, wherein the water soluble fluoride is sodium fluoride.

7. A method according to claim 5, wherein the calcium sulphate is gypsum or calcium sulphate hemihydrate or anhydrite.

8. A method according to claim 5, wherein the aluminous cement is high alumina cement or calcium monoaluminate or both.

9. A dry cementitious composition to be mixed with water, the composition comprising an aluminous cement, a calcium sulphate in a weight ratio of about 3:7 to 4:1 relative to the cement, a water soluble fluoride in a concentration of from about 4% to about 10% by weight relative to the aluminous cement, and an accelerator comprising a lithium salt in a weight ratio of about 0.1 to about 1% by weight relative to the aluminous cement, whereby on mixing the dry composition with water, the composition sets rapidly to form ettringite and to develop early compressive strength.

10. A composition according to claim 9, wherein the water soluble fluoride is sodium fluoride.

11. A composition according to claim 9, wherein the calcium sulphate is gypsum or calcium sulphate hemihydrate or anhydrite.

12. A composition according to claim 9, wherein the lithium salt is selected from the group of lithium hydroxide and lithium carbonate.

13. A composition according to claim 9, wherein the aluminous cement includes calcium monoaluminate.

14. A composition according to claim 9, wherein the aluminous cement is a high alumina cement.

15. A composition according to claim 14, wherein the aluminous cement comprises not less than 32% alumina and has an alumina : calcium oxide ratio of 0.85 to 2:1.

16. A composition according to claim 9, further compris additives selected from the group of retarders, cement, surfactants and thickeners are present.

* * * * *